(12) United States Patent
Asati et al.

(10) Patent No.: US 7,940,777 B2
(45) Date of Patent: May 10, 2011

(54) LOSS-FREE PACKET NETWORKS

(75) Inventors: Rajiv Asati, Morrisville, NC (US); Greg Thompson, Livermore, CA (US); Christopher Metz, Danville, CA (US); Samir Parikh, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 158 days.

(21) Appl. No.: 12/037,631

(22) Filed: Feb. 26, 2008

(65) Prior Publication Data

US 2009/0213726 A1 Aug. 27, 2009

(51) Int. Cl.
*H04L 12/56* (2006.01)

(52) U.S. Cl. .................. 370/395.52; 370/469; 714/746; 714/752

(58) Field of Classification Search .................. None
See application file for complete search history.

(56) References Cited

U.S. PATENT DOCUMENTS

| | | | |
|---|---|---|---|
| 6,061,650 A | 5/2000 | Malkin et al. | |
| 6,151,628 A | 11/2000 | Xu et al. | |
| 6,243,846 B1 | 6/2001 | Schuster et al. | |
| 6,611,532 B1 | 8/2003 | Madour et al. | |
| 6,732,314 B1 | 5/2004 | Borella et al. | |
| 6,985,963 B1 | 1/2006 | Johnson et al. | |
| 7,277,432 B2 * | 10/2007 | Liang et al. ................ | 370/389 |
| 2002/0060985 A1 * | 5/2002 | Lee et al. ................... | 370/216 |
| 2002/0194570 A1 * | 12/2002 | Birru et al. ................. | 714/792 |
| 2003/0053454 A1 * | 3/2003 | Katsavounidis et al. ..... | 370/389 |
| 2003/0231658 A1 * | 12/2003 | Liang et al. ................ | 370/469 |
| 2005/0147104 A1 * | 7/2005 | Ould-Brahim ............. | 370/395.5 |
| 2005/0229074 A1 | 10/2005 | Chawla et al. | |
| 2006/0007925 A1 * | 1/2006 | Wright et al. .............. | 370/389 |
| 2006/0159183 A1 * | 7/2006 | Gaddam et al. ........... | 375/240.26 |
| 2006/0291475 A1 * | 12/2006 | Cohen ....................... | 370/395.42 |
| 2007/0033477 A1 * | 2/2007 | Yoon .......................... | 714/748 |
| 2007/0206673 A1 * | 9/2007 | Cipolli et al. ............. | 375/240.1 |
| 2008/0232244 A1 | 9/2008 | Gerstel et al. | |
| 2009/0028230 A1 * | 1/2009 | Leitner ....................... | 375/224 |
| 2009/0201805 A1 * | 8/2009 | Begen et al. ............... | 370/225 |

FOREIGN PATENT DOCUMENTS

| | | |
|---|---|---|
| WO | WO 2005/101717 | 10/2005 |
| WO | WO 2009/108763 | 9/2009 |

OTHER PUBLICATIONS

Silver Peak Scalable WAN Accleration, obtained at http://www.silver-peak.com/Solutions/fec.htm, 1 page.

(Continued)

*Primary Examiner* — Donald L Mills
(74) *Attorney, Agent, or Firm* — Patent Capital Group (57) ABSTRACT

In one embodiment, a method can include: receiving a packet in a device; classifying the received packet as a first packet type or a second packet type; when the packet is the first packet type, forwarding the packet to a next hop; and when the packet is the second packet type: performing forward error correction (FEC) encoding on the packet to generate repair data, modifying the packet by adding a multi-protocol label switching (MPLS) header to indicate that the packet is to be forwarded on an FEC-protected label switched path (LSP), generating an additional MPLS packet carrying the repair data, and forwarding the modified packet and the additional packet to a next hop.

20 Claims, 7 Drawing Sheets

OTHER PUBLICATIONS

Cisco "Cisco Announces Industry's First Network-Based, Standards-Based Rapid Channel-Change and Video Error Repair Technology to Enhance IPTV Viewing Experience over IP NGNs", obtained at http://newsroom.cisco.com/dlls/2006/prod__120306b.html 3 pages.

PCT, International Preliminary Report on Patentability, Date of Issuance Aug. 31, 2010 (1 page), Written Opinion of the International Searching Authority (6 pages), and International Search Report mailed Jul. 13, 2009 (3 pages) for PCT/US2009/035260.

PCT, International Preliminary Report on Patentability, Date of Issuance Oct. 19, 2006 (1 page), Written Opinion of the International Searching Authority (4 pages), and International Search Report mailed Sep. 1, 2006 (1 page) for PCT/US2005/011799.

Feldmeier, et al, "Protocol Boosters," IEEE Journal on Selected Areas in Communications, vol. 16, No. 2, Apr. 1998, 14 pages.

* cited by examiner

LOSS-FREE PACKET NETWORKS

TECHNICAL FIELD

The present disclosure relates generally to IP/MPLS networks used to carry video and other real-time services, and more specifically to the usage of packet loss erasure or reduction techniques in such networks.

BACKGROUND

As more Internet protocol (IP)/multi-protocol label switching (MPLS) networks continue to deploy mission-critical real-time traffic, such as video, etc., substantial avoidance of packet loss (due to any kind of failure in the network) is becoming more important than ever before. This is because standard definition television (SDTV) and high definition television (HDTV) video traffic (e.g., encoded using MPEG-2, MPEG-4 AVC, SMPTE VC-1, or other common video codecs), typically carried using user datagram protocol (UDP) over IP, is highly susceptible to packet loss due to its significant level of compression, and may result in visual degradation even with a single lost packet.

DESCRIPTION OF EXAMPLE EMBODIMENTS

Overview

In one embodiment, a method can include: receiving a packet in a router; classifying the received packet as a first packet type or a second packet type; when the packet is the first packet type, forwarding the packet to a next hop; and when the packet is the second packet type: performing forward error correction (FEC) encoding on the packet to generate repair data, modifying the packet by adding a multi-protocol label switching (MPLS) header to indicate that the packet is to be forwarded on an FEC-protected label switched path (LSP), generating an additional MPLS packet carrying the repair data, and forwarding the modified packet and the additional packet to a next hop.

In one embodiment, a method can include: receiving a packet in a device; determining if the received packet is a first packet type or a second packet type; when the packet is the first packet type, forwarding the packet to a next hop; and when the packet is the second packet type: performing FEC decoding on the packet, modifying the packet by removing an MPLS header indicating an LSP, and forwarding the modified packet to a next hop.

Example Embodiments

Video adoption is rapidly growing among IP/MPLS network operators (e.g., service providers, enterprises, content providers, etc.). These network operators typically utilize compression techniques, such as moving picture experts group (MPEG)-2, -4 advanced video coding (AVC), SMPTE (Society of Motion Picture and Television Engineers) video codec standard (VC-1), etc., to affordably transport SDTV and/or HDTV video traffic, while also delivering a high quality experience to viewers. As network operators continue to increase IP video and other mission-critical/real-time traffic on their IP/MPLS networks, "zero packet loss" for some or all such traffic becomes important, despite possible failures in the network.

Achieving zero packet loss is challenging due to the nature of packet-switching networks, where a packet may be dropped for any number of reasons, such as transmission bit errors, congestion loss due to depleted buffer space on a packet switching node, a flapping link, or other changes in network topology. For example, to keep a rate of visual artifacts to under once per 2 hour movie, using SD and HD KMEG streams typically encoded at between 2 to 12 Mbps, packet loss ratios (PLRs) need to be under $1 \times 10^6$, a PLR much lower than is common in many IP networks. For this reason, packet erasure FECs, such as SMPTE 2022-1, also known as COP3, and Digital Fountain Raptor 10, are often used to protect real-time video streams delivered over IP networks. While the use of MPLS fast reroute (FRR) technique can facilitate a reduction in outage to a particular range (e.g., from about 1 ms to about 50 ms), this is still greater than zero loss, and may result in extended visual artifacts disturbing to subscribers. To overcome this limitation, particular embodiments can integrate FERR with other techniques to correct for packet losses during such FERR outage intervals.

As discussed above, packet loss can generally occur due to link failure, node failure, congestion loss, software or hardware issues, and/or other reasons (e.g., operator errors, misconfiguration, etc.). Moreover, the failures within an IP network can occur due to factors beyond a network operator's control (e.g., a fiber cut). In building a "zero packet loss" IP/AFPLS network, particular embodiments can integrate forward error correction (FEC) into the TP/MPLS nodes. FEC is a known technique implemented using packet erasure FEC codes that may be employed between any two nodes to recover from packet loss by utilizing repair packets. Using FEC, repair packets may be sent along with source packets by a source node to one or more destination nodes, which can then utilize the repair packets to reconstruct original data if any transmitted packets were lost.

FEC technology has been widely deployed for a number of applications, although usually either on a per-link basis at the physical or data link layers, or on a per-application basis at the session or application layers. FEC performed at the physical or link layer between two nodes is typically performed using an FEC, such as Reed Solomon used to correct for bit errors, and which does somewhat reduce the packet loss. However, because of the buffering and interleaving needed to create the repair packets for a given protection period, additional delay may be imposed on the traffic. Since it is done at the link layer, it affects all packets and flows, including applications like Voice over IP (VoIP), which may be very sensitive to additional delay or latency. For this reason, additional FEC protection for applications, such as video, often occurs at a higher layer where it is only applied to application flows that need it, eliminating unnecessary FEC processing and imposed latency on flows that do not need such FEC protection. Thus, erasure FEC techniques are typically deployed either: (i) at application layer end points (e.g., video encoder and decoder set-top boxes (STBs) for MPEG), or (ii) above the transport layer between a source node (application source) and a destination node (application destination) without visibility of, or coordination with, an underlying IP/MPLS network infrastructure.

Such functional partitioning may restrict the utilization and effectiveness of FEC in IP/MPLS networks because: (i) the routers typically neither implement the application layer (e.g., for video), nor serve as the application source/destination; (ii) it may not be economical to place FEC between every two directly connected routers, since an IP/MPLS network may have hundreds or thousands of routers; (iii) it may not be feasible to have compatible FEC functionality enabled on all the application sources (e.g., encoders, video on demand (VOD) servers, etc.) and application destinations (e.g., set top boxes (STBs), PCs, cell phones, etc.) due to the number of end points, different vendors, and lack of universal support; and (iv) it may not be feasible to have FEC included on every application stack (e.g., video, voice, telepresence, gaming, etc.).

Varieties of FEC are known to offer not only error correction, but also erasure correction (or erasure concealment) recovering from entire lost packets as opposed to individual bit errors. Erasure correction is most effective in concealing packet loss effects between source and destination nodes. In particular embodiments, a framework is provided whereby routers (e.g., edge routers) in IP/MPLS networks are enabled with an FEC technique. For example, an edge router may implement the FEC engine on a line card, or in another suitable location. In particular embodiments, an MPLS label switched path (LSP) may be designated for the FECed packets whereby the label is bound to the FEC scheme. This can allow FEC to be performed within an IP/MPLS network in a "multi-hop" and "multi-point" manner.

In particular embodiments, a framework for enabling packet-loss free delivery of mission-critical/real-time unicast and multicast traffic (e.g., IP video traffic, etc.) from an ingress to one or more egress routers is provided. Because FEC is contained within the network and is substantially transparent to end-hosts, the FEC becomes a service within an IP/MPLS network, and may be used by a network operator to provide a competitive advantage and improved service-level agreements (SLAs). FEC processing can become a resource that can be dynamically allocated, managed and statistically shared across various applications and sources than need it, thus reducing cost over strictly dedicated approaches. Further, particular embodiments can be used with any suitable FEC technique, thus providing greater flexibility to dynamically match to specific application requirements and conditions.

Particular embodiments integrate erasure FEC on edge routers at the IP/MPLS layer, and that can be leveraged end-to-end in a multi-hop and multi-point manner. Further, a suitable routing protocol can be used to convey the FEC control plane information. This approach complements link-layer FEC capabilities, and may provide enhanced video quality experience (VQE).

Erasure correction FEC techniques generally apply either: (i) above the transport layer between directly connected nodes; or (ii) at the MPEG layer at video encoders and/or decoders (e.g., STBs). However, it may not be cost effective to employ FEC between every two directly connected routers, to have FEC functionality enabled on the video encoder/decoder, or to have application-specific FEC for every application other than video. Thus, it is increasingly important to integrate the FEC techniques on the IP devices or nodes that may be non-adjacent to each other. In particular embodiments, FEC techniques are configured on the IP/MPLS network so as to substantially provide packet loss free delivery of mission-critical real-time traffic (e.g., video traffic, etc.) from ingress to egress routers.

As discussed above, current FEC frameworks typically apply to the application layer, and associated FEC related information is usually conveyed between layers 4 and 6 of the ISO/OSI stack. The FEC decoder removes the layer 3 and layer 4 encapsulations, thus obtaining the FEC related information. However, this approach is problematic when the FEC is to be performed on the IP/MPLS routing devices that are not end-hosts. Thus, certain embodiments can integrate FEC techniques on IP devices that may not be adjacent routers.

Particular embodiments can accommodate point-to-point, where an IP packet is unicasted (e.g., video-on-demand (VOD) or video conferencing) or multipoint, where an IP packet is multicasted (e.g., broadcast video), implying that the IP packet may be received by more than one IP device at substantially a same time. Particular embodiments can also accommodate multi-hop, where an IP packet may be propagated in a network including multiple hops before reaching a destination node. In this case, it may not be desirable to have every hop in the path encode and decode FEC packets (e.g., due to cost, performance, etc.). Accordingly, particular embodiments can enable FEC encoded IP packets to be forwarded from an ingress router to one or more egress routers, and may support multi-hop IP devices in a multi-point manner. Further, certain embodiments can include additional compression of an FECed IP packet so as to reduce FEC usage related bandwidth.

Figure 1:
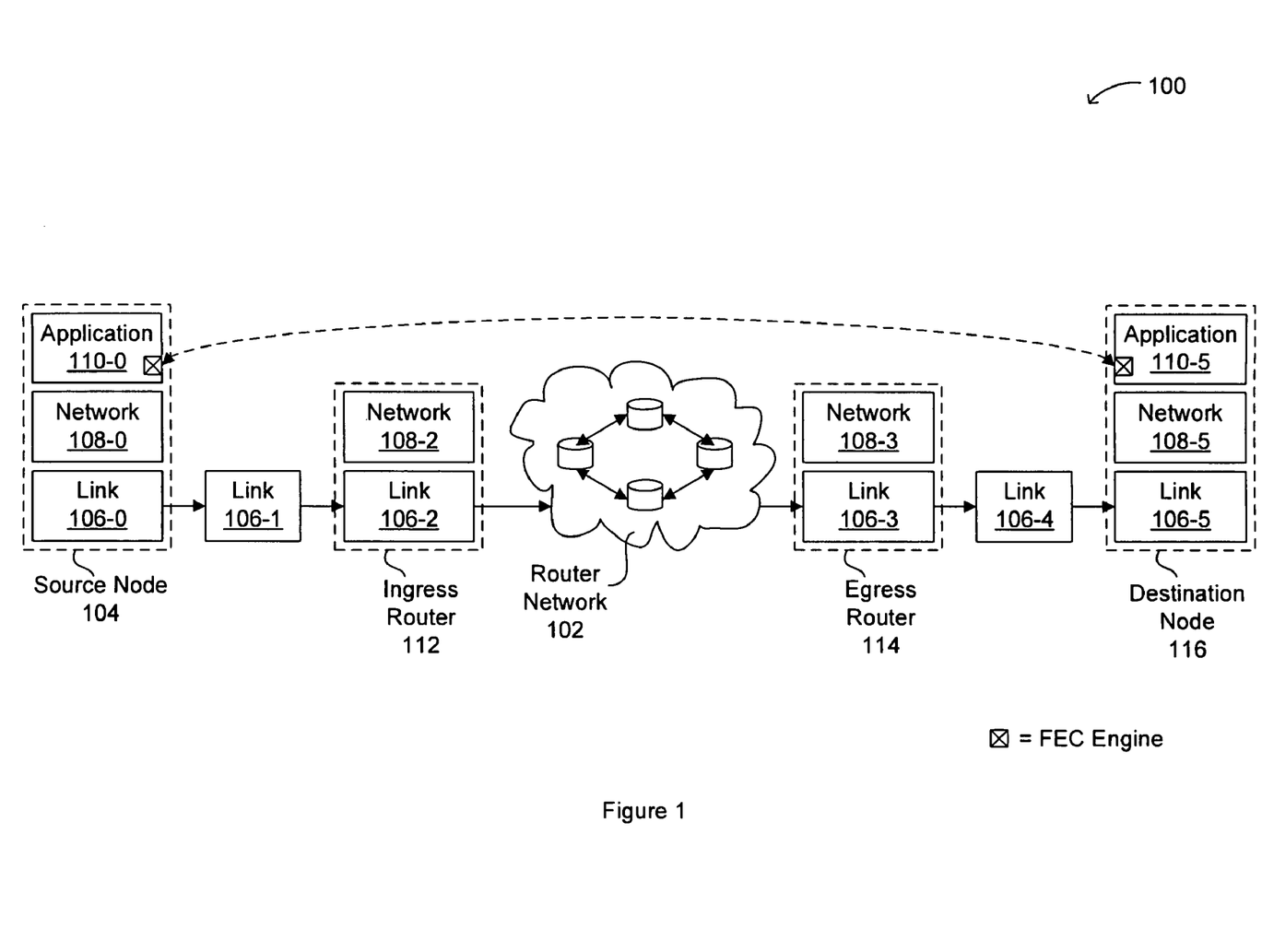
FIG. 1 illustrates an example network with forward error correction (FEC) engines in the application layer.

Referring now to FIG. 1, shown is an example network 100 with FEC engines in the application layer. Source node 104 can include link layer 106-0, network layer 108-0, and application layer 110-0. Source node 104 may also include transport, session, and presentation layers, though not shown. In this example, packets can flow via a link layer 106-1 to ingress router 112, which can include link layer 106-2 and network layer 108-2. A router network 102 can be positioned between source and destination sides of the network. Packets can pass through router network 102 to egress router 114, which can include link layer 106-3 and network layer 108-3. Link layer 106-4 can provide a path between egress router 114 and destination node 116, which can include link layer 106-5, network layer 108-5, and application layer 110-5, as well as transport, session, and presentation layers.

FEC is typically deployed either at the link layer or at the application layer, as is shown in FIG. 1 (see, e.g., FEC engines in application layers 110-0 and 110-5). However, while FEC above the link layer may be suitable for some applications because it can be targeted to those applications, this approach can burden other applications that may not handle FEC as well due to the latency involved. Further, transparent protection can be provided at layers accommodating FRR and the like, without having to modify all of the end points. In FEC, an original stream of data may be provided to an algorithm to generate extra information (e.g., repair packets), which may be sent along with the original data. Accordingly, FEC-based protection includes information sufficient so that an end point can regenerate the original source string in the event of an error.

In certain embodiments, any mission-critical data having lossless or very low loss characteristics can use the approach described herein to correct errors regardless of the particular application. As shown in FIG. 1 however, source node 104 and destination node 116 would need FEC on each link, or on each application desired for zero loss on the network. For example, an application might be VOD, where source node 104 is a VOD server, and destination node 116 is an STB.

Particular embodiments include FEC being performed along IP/MPLS routers (e.g., ingress and egress routers 112 and 114) that essentially act as pass-throughs for traffic destined towards end-hosts (e.g., destination node 116). Unlike the source or destination end-hosts, the IP/MPLS edge routers may typically be in positions other than source or recipient of the application traffic (e.g., video traffic), since routers may not implement the application stack. Thus, the FEC may be performed at layers 3 and/or 4, without awareness at layers 5, 6, or 7, on the IP/MPLS routers. Further, a given router may perform the FEC processing either on a line card, or on another suitable service card or hardware subsystem.

Figure 2:
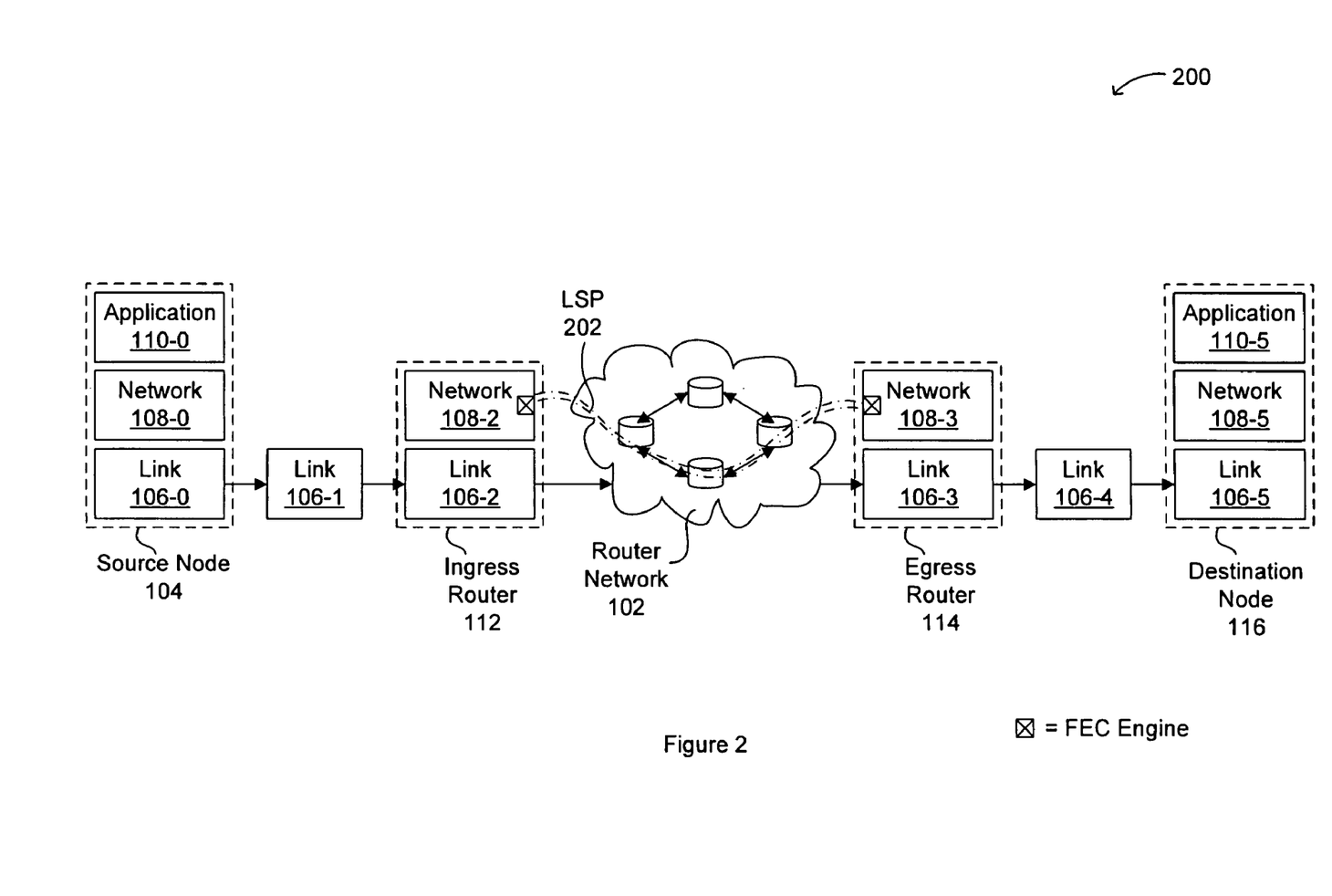
FIG. 2 illustrates an example network with FEC engines in the network layer associated with an MPLS label switched path (LSP).

Referring now to FIG. 2, shown is an example network 200 with FEC engines in the network layer associated with an MPLS label switched path (LSP). LSP 202 can form a tunnel or MPLS pipe established for a packet flow within the LSP, and may have FEC protection applied. Thus, LSP 202 can be used to identify at least one "protected" flow for zero packet loss delivery. Packets exiting LSP 202 can be decoded using an appropriate FEC decoding algorithm in egress router 114, such that any packets traveling through that LSP may be zero loss, or some other predetermined loss level and amount of latency. Thus, egress router 114 can reconstruct the original packet stream, sending the stream to the next hop intended for application 110-5 in destination node 116 with substantially no packet loss. Further, an amount of coverage necessary to close a gap left in FRR coverage can be supplied using FEC in particular embodiments.

FEC approaches involve a calculation of extra packets to fill in missing data in order to reconstruct an original packet. One proprietary FEC algorithm is Digital Fountain's Raptor code, which is used in a number of different standards, such as 3$^{rd}$ Generation Partnership Project (3GPP) and Digital Video Broadcasting for Handhelds (DVB-H). In certain embodiments, a maximum allowed packet loss ratio (PLR) (e.g., no more than an order of $1\times10^{-6}$ packets lost per packets sent over a predetermined time period), or maximum allowed number of artifacts (e.g., no more than one glitch per movie), may be indicated as a predetermined "tunable" loss level. For example, Pro-MPEG Forum's Code of Practice #3 (CoP3), now standardized as the Society of Motion Picture and Television Engineer's (SMPTE) 2022-1 standard, FEC algorithm may not be sufficient to reach this loss level, but Raptor can be used as a supplement to achieve the desired protection level.

In particular embodiments, an MPLS tunnel (e.g., LSP) can be associated with different applications, and a selection mechanism can be used to allow certain services to be tied to a desired protection level. In an IP tunnel operation example, IP video traffic of interest may be FECed (and compressed, if needed) by ingress router 112, and encapsulated inside another IP header with new IP source and/or destination addresses. The packet can be sent to intended egress routers (e.g., 114), that may associate designated source and/or destination IP addresses with the FEC decoding engine, which can reconstruct the original packet for further processing (e.g., for forwarding to destination node 116).

By using an MPLS label as described herein, changes in an IP header of an original packet, or for an additional IP header, can be substantially eliminated. Further, inserting and/or parsing other headers, such as IP or UDP headers, can be substantially eliminated. Particular embodiments can involve: (i) a control plane to either statically configure or dynamically distribute via a signaling protocol (e.g., a routing protocol, such as border gateway protocol (BGP)) the FEC-encoding/decoding related information and labels to edge routers; and (ii) a forwarding plane to carry the FECed IP packet on the designated MPLS LSP within the network. Particular embodiments as described herein use the dynamic method, though the static method is another viable method.

In the control plane, the ingress routers (e.g., 112) relatively close to a video source (e.g., source node 104) may contain an FEC-encoding engine. Ingress router 112 can distribute an "upstream-assigned" MPLS label (e.g., for LSP 202) using a signaling protocol (e.g., BGP routing protocol, or a label distribution protocol, etc.) to multi-hops away egress routers (e.g., 114), which can house an FEC-decoding engine. The distribution can also include associated FEC control plane information (e.g., classification of source and repair flows, FEC instances and associated FEC scheme ID, FEC Payload ID, FEC scheme specific information, etc.) The upstream MPLS label may then be mapped to either a point-to-point (P2P) or a point-to-multipoint (P2MP) IP or MPLS tunnel for either an egress router or multiple egress routers respectively, etc., as configured, at the ingress router. This label value can indicate that an MPLS packet received with such a label value desires predetermined FEC-decoding treatment at the egress router.

In the forwarding plane, ingress router 112 can place, e.g., a label designating LSP 202 between a tunnel delivery header and the FECed packet. The tunnel delivery header may be for either MPLS tunnel or IP tunnel to one (P2P) or more (P2MP) egress routers. For an MPLS tunnel, the tunnel delivery header may include an MPLS label stack, such that the FECed packet may be delivered with only an MPLS label corresponding to LSP 202 to the designated one or more egress routers. For an IP tunnel, the tunnel delivery header may include an IP header that is imposed by the ingress router and disposed by the designated one or more egress routers, exposing the FECed packet with an MPLS label corresponding to LSP 202. The intermediate routers, if any, may only evaluate the tunnel delivery header information for forwarding the packets. The label value (e.g., designating LSP 202) indicates that an MPLS packet received with such a label value deserves special FEC-decoding treatment in egress router 114. Thus, upon receiving such an MPLS packet with a predetermined/protected label value, egress router 114 can remove the MPLS header and hand over the payload to the FEC-decoding engine, which can then reconstruct the original packet. Traffic that may not need such protection can continue to flow without using the protected label.

Particular embodiments integrate support for packet erasure FECs into an IP/MPLS network in both a multi-hop and multi-point manner, thus building a zero packet loss MPLS LSP that can be used to transparently provide highly available loss-free packet transport services supporting video delivery without requiring separate support in each application.

Particular embodiments are also adaptable to any type of traffic (not just video), and generally: (i) make the IP/MPLS network more intelligent; (ii) make the IP/MPLS network more valuable by offering FEC services to other applications pertaining to quad-play; (iii) apply to converged networks, such that FEC functionality may only be needed on the edge routers; (iv) integrate FEC on routers that may be multiple hops away, and works for both point-to-point traffic (unicast) and point-to-multipoint traffic (multicast) by setting up P2P or P2MP MPLS LSPs; (v) minimize packet overhead (MPLS headers only take 4 bytes); and (vi) enable the service provider to offer the SLA with zero packet loss.

Figure 3:
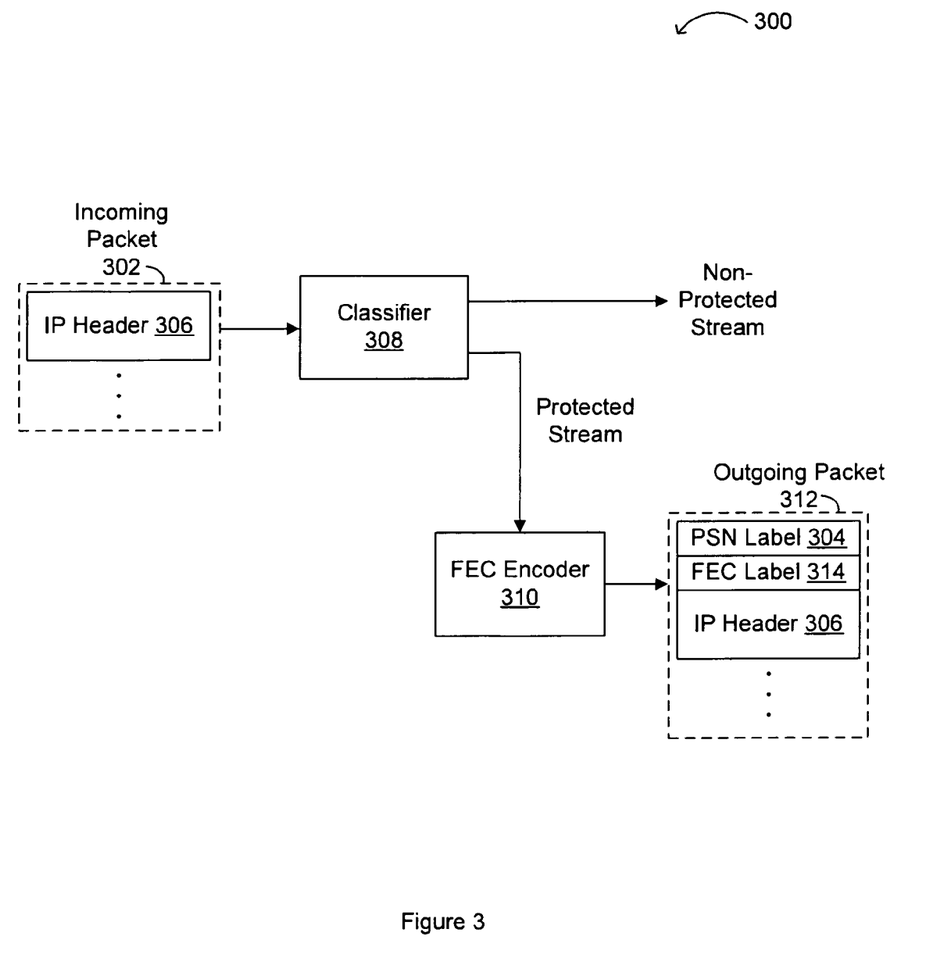
FIG. 3 illustrates an example of FEC-enhanced packet processing in an ingress router.

Referring now to FIG. 3, shown is an example 300 of FEC-enhanced packet processing in an ingress router. Incoming packet 302, which can include IP header 306, as well as a transport header (not shown), can be classified as intended to be FEC protected or not, using classifier 308. FEC encoder 310 can be used to generate repair packets as part of a suitable FEC algorithm performed on incoming packet 302. Outgoing packet 312 (e.g., a repair packet) can then be encapsulated with optional IP header 306, an MPLS header with FEC label 314 (e.g., which may indicate an LSP, such as LSP 202), and a packet switched network (PSN) IP header or MPLS header (with label 304). Incoming source packet 302 may be modified to include FEC information, if any, in addition to the MPLS header containing FEC label, and a PSN IP header or MPLS header. The PSN IP header may be used when a suitable IP tunneling mechanism, such as generic routing encapsulation (GRE) tunnel, etc., is used instead of MPLS tunneling to establish an P2P or P2MP tunnel. In this fashion, an ingress router can intelligently intercept IP packets to be FECed, and place them on a pre-calculated MPLS LSP after completing the FEC processing. Such LSPs may be referred to as zero loss MPLS LSPs. Further, the source and repair packets may be placed on a same LSP, or on different LSPs.

PSN label 304 may be distributed using a signaling protocol, such as label distribution protocol (LDP), resource reservation protocol (RSVP), etc., and FEC label 314 may be distributed by a same or different signaling protocol (e.g., LDP, RSVP, BGP, etc.). Thus, there may be an MPLS label stack including more than MPLS headers, whereby the inner MPLS header contains the FEC label. Alternatively, a single label to identify the FEC and the PSN can be utilized in particular embodiments. Such an alternative can allow for increased scalability. In either approach, an FEC label can be interpreted by an egress router for designation to an FEC decoder for FEC processing. Generally, an FEC label (e.g., label 314, which may indicate LSP 202) can be mapped to a PSN tunnel by static or dynamic means. Hence, the control plane can calculate the placement of FEC label 314 over a PSN label 304 (or FEC LSP over PSN LSP), resulting in the MPLS label stack. This information can be stored in a related forwarding entry (e.g., in a forwarding database) that is used to forward the classified packets.

Figure 4:
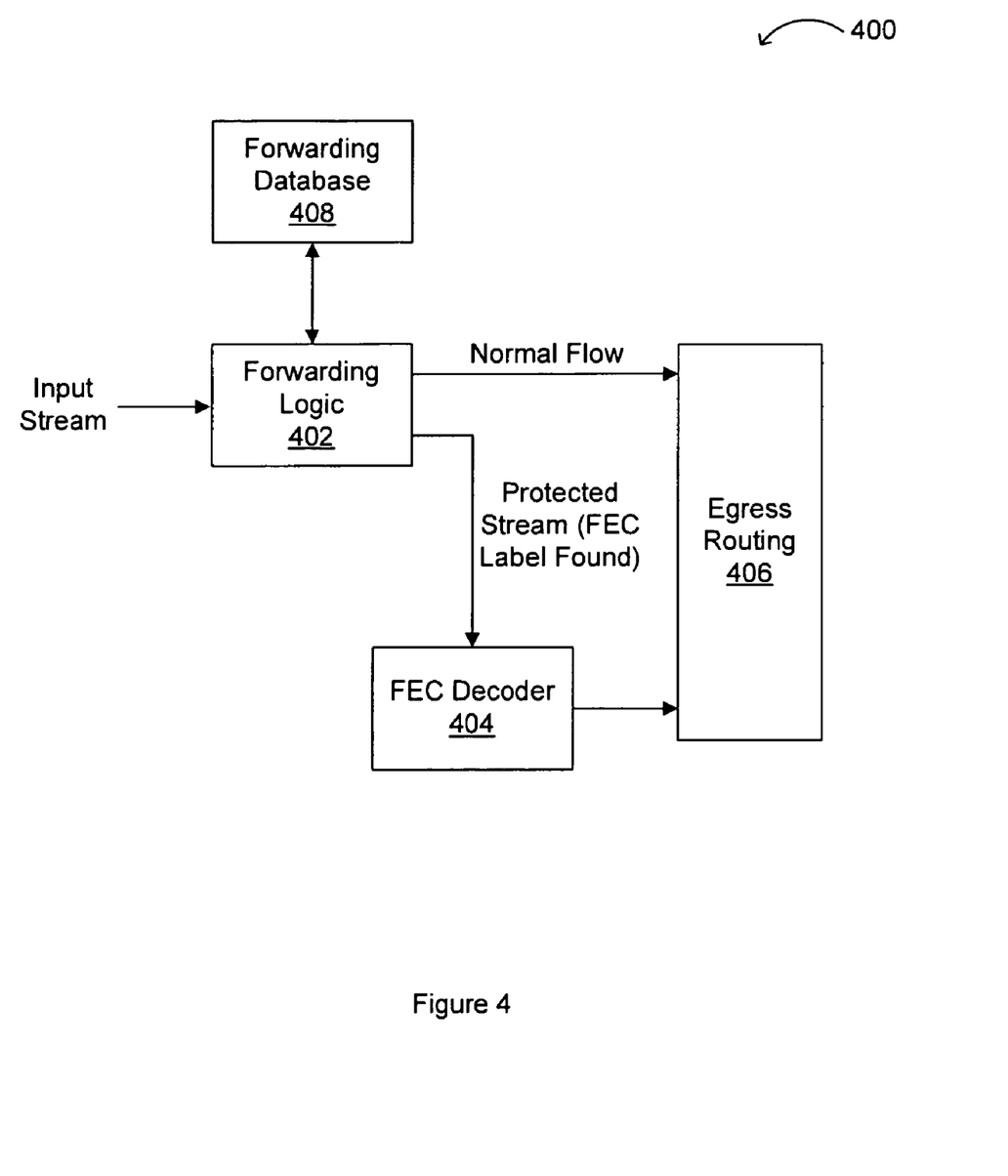
FIG. 4 illustrates an example of FEC-enhanced packet processing in an egress router.

Referring now to FIG. 4, shown is an example 400 of FEC-enhanced packet processing in an egress router. If a packet is received as an IP packet with a designed destination IP address, such as egress router's IP address or multicast IP address, etc., then the received packet may be classified using the same or similar classification rules as the ones used by the ingress router, to determine whether this flow is related to any FECed flow. If so, then the outer IP header may be removed and the remainder of the packet can be passed to the FEC logic (e.g., FEC decoder 404). If the packet received is an MPLS packet, then forwarding logic 402 can look up in forwarding database 408 for a label in an MPLS header from an incoming packet in the input stream. If a match is found, the MPLS header can be removed (forwarding database 408 may suggest a removal), and the protected packet can be redirected to FEC decoder 404 for reconstruction of original packets, if some transmitted packets were not received. FEC decoder 404 can redirect the reconstructed original packets back to the forwarding logic 402, which can dictate packet forwarding towards destination nodes via egress routing 406.

Accordingly, FEC encoders and decoders can operate on classified packet flows to ultimately provide essentially zero loss to the classified packet flows (e.g., video, Web traffic, or other mission-critical real-time packet flows). For example, if only a video flow is to be protected, video packets can be identified by using a classifier, and steered to FEC logic. Classifiers can use the information provided either statically or dynamically via the control plane, as discussed above. The information may include one or more IP addresses, one or more transport ports, one or more MPLS labels, etc., or combinations thereof. Such a classifier can identify a flow, and determine whether the flow needs FEC protection or not. Further, information about the labels may be distributed via a signaling protocol, as discussed above, and stored in forwarding database 408.

Figure 5:
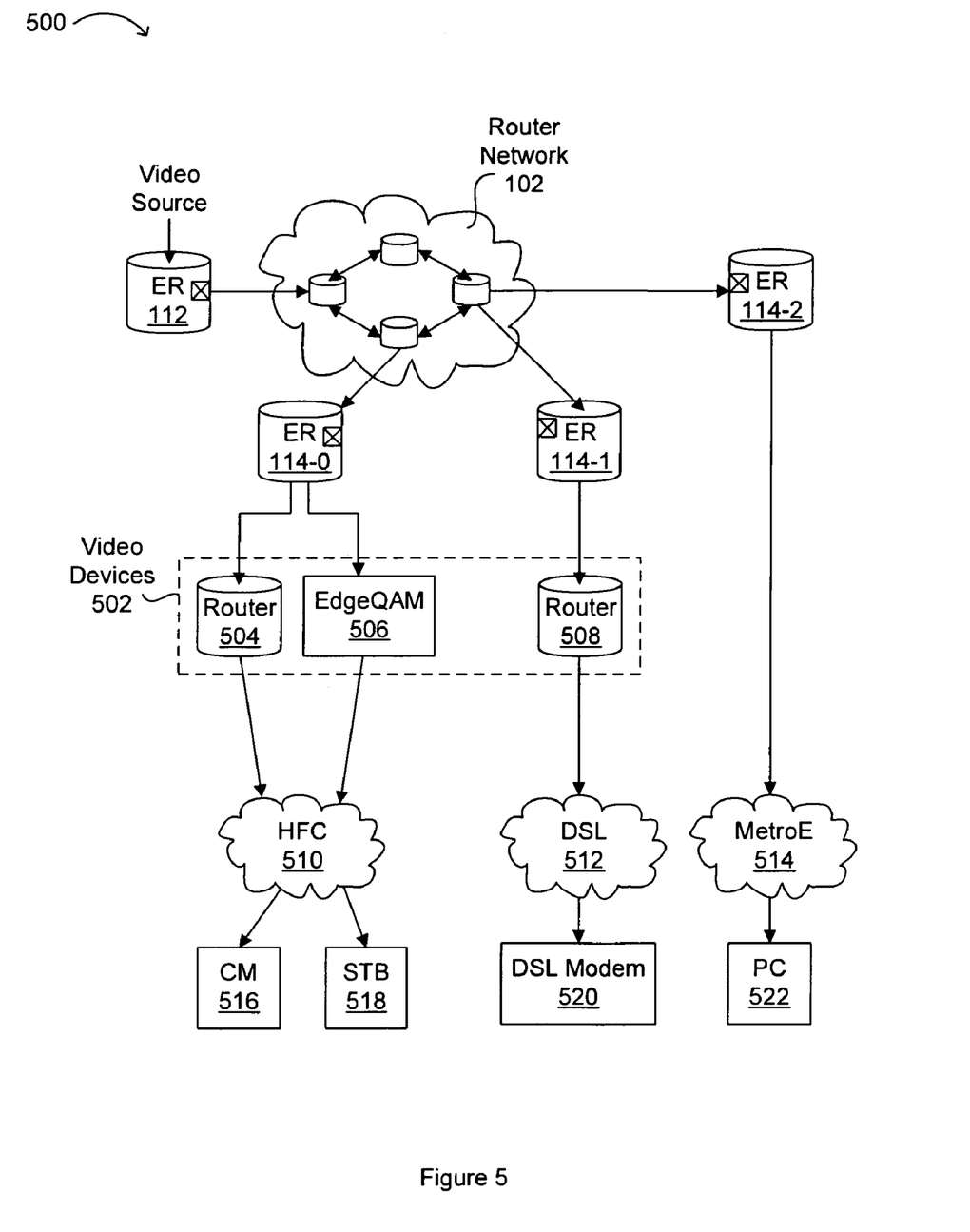
FIG. 5 illustrates an example FEC-enabled IP/MPLS network where FEC becomes a service provided by the network.
Figure 6:
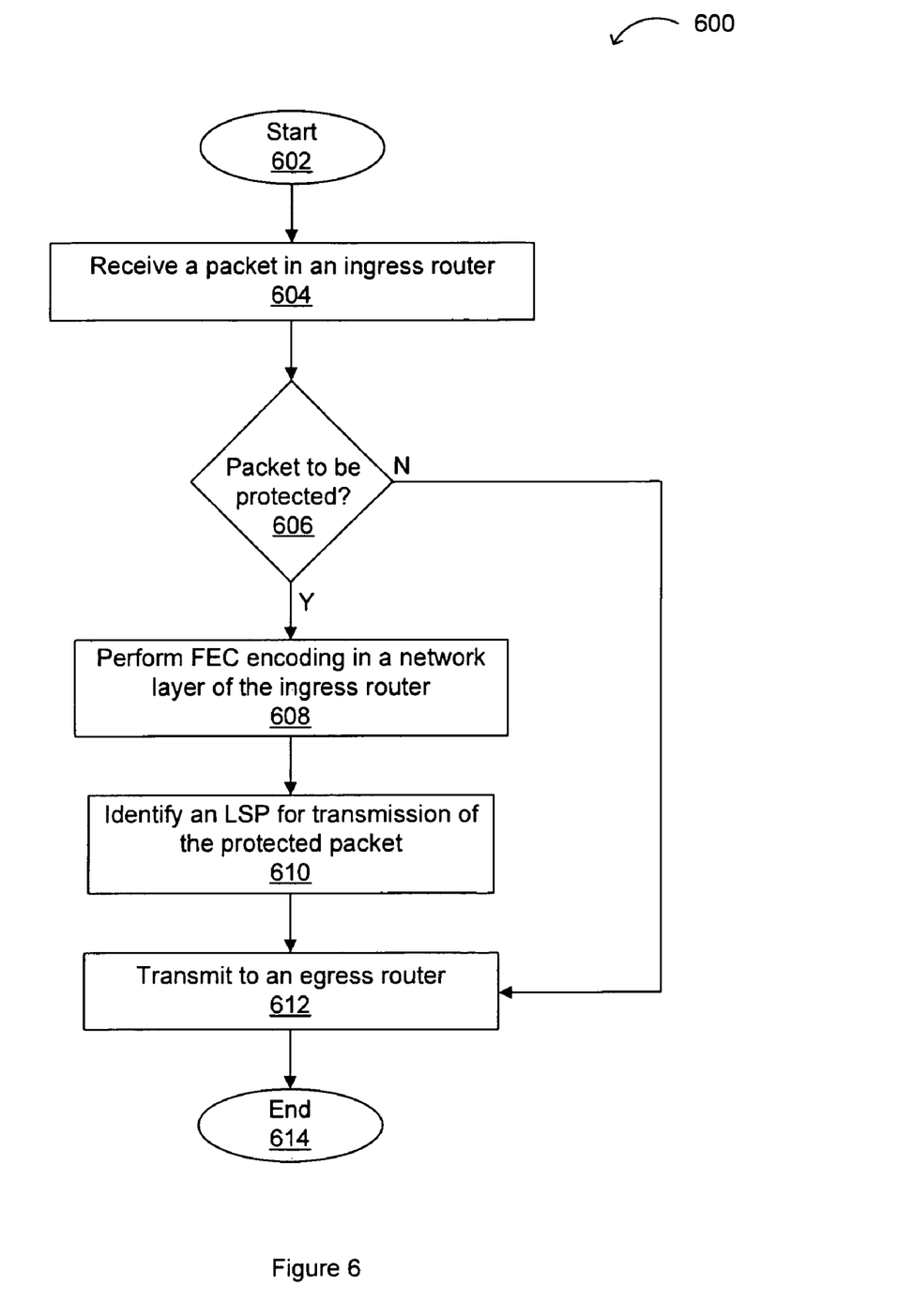
FIG. 6 illustrates a flow diagram of an example method of processing a packet in an ingress router.

Referring now to FIG. 5, shown is an example FEC-enabled IPMPLS network 500 where FEC becomes a service provided by the network, such as for IP TV applications. A video source can be received an edge router 112, which can include an FEC encoder for sending protected flows via router network 102. Egress routers 114-0, 114-1, and 114-2, can be equipped with FEC decoders for packets identified as protected (e.g., sent via an appropriate LSP). Video devices 502 can include router 504 (e.g., cable modem termination system (CMTS)), edge quadrature amplitude modulator (EdgeQAM) 506, and router 508. Personal computers (PCs) and other IP devices can also be included in the video path. Hybrid fibre-coaxial (HFC) 510 can provide paths to cable modem (CM) 516 and cable STB 518. Digital subscriber line (DSL) 512 can provide paths to DSL modem 520, which can then forward video to IP-STBs and PCs in the home, Metro Gigabit Ethernet (MetroE) 514 can also provide paths to IP-STBs or PC 522. 1401 Referring now to FIG. 6, shown is a flow diagram of an example method 600 of processing a packet in an ingress router. The flow begins 602, and a packet can be received by an ingress router (604). If the packet is to be protected (606) as per the classification rules, FEC encoding can be performed in a network layer (and/or transport layer) of the ingress router (608). An LSP for transmission of the protected packet can be identified (610), and the packet can be transmitted towards at least one egress router (612), completing the flow 614.

Figure 7:
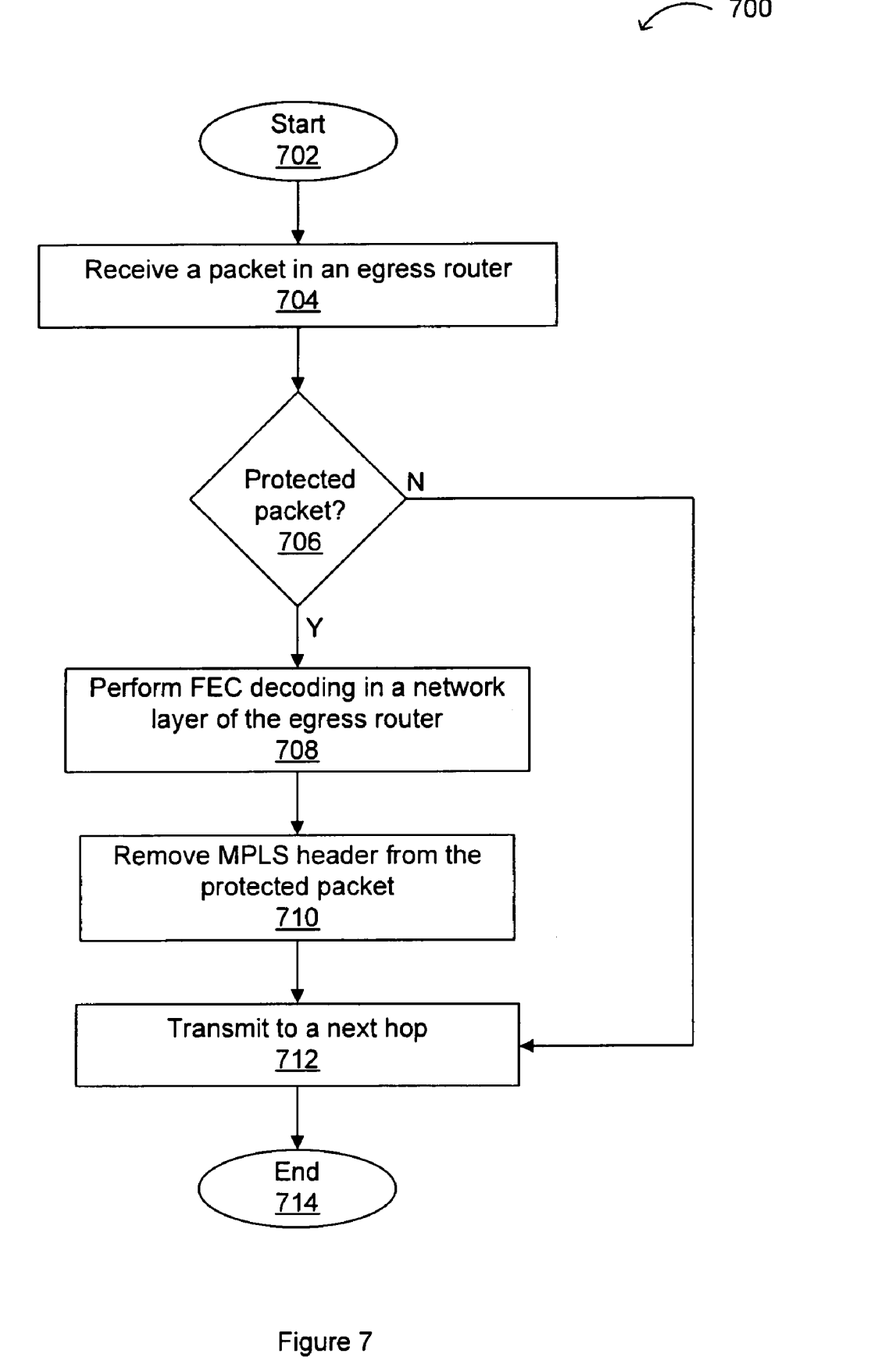
FIG. 7 illustrates a flow diagram of an example method of processing a packet in an egress router.

Referring now to FIG. 7, shown is a flow diagram of an example method 700 of processing a packet in an egress router. The flow begins 702, and a packet can be received in an egress router (704). If the packet is designated as protected (706), FEC decoding can be performed in a network layer of the egress router (708). An MPLS header from the protected packet can be removed (710), and the packet can be transmitted to a next hop (712), completing the flow 714. Further, in some embodiments, the packet may not be transmitted outside of the egress router, such as when the egress router includes the destination node.

In this fashion, FEC encoding/decoding can be performed on transient devices, such as routers that are not end points (e.g., source or destination nodes), and may in fact be multiple hops away from source or destination nodes. As described herein, MPLS labels can be utilized to identify packets for FEC protection. Thus, there may be no need to add/parse or modify IP or transport header information at either an ingress and/or an egress router. Rather, the label (e.g., a 20-bit value) can be viewed to determine an FEC protected flow.

In addition, particular embodiments can accommodate the sending of both protected streams, as well as unprotected streams, together. For example, protected and unprotected flows may be sent over the same PSN tunnel, where the presence of an FEC label can trigger an egress router to determine which flow is protected and may need FEC decoding, and which flow is unprotected and does not need FEC decoding. For protected flows, the source flow and repair flow may be encapsulated within the same FEC label by the ingress router. For protected flows, the source flow may be sent without the FEC label.

Although the description has been described with respect to particular embodiments thereof, these particular embodiments are merely illustrative, and not restrictive. For example, while video applications have been described herein, particular embodiments can be utilized in any suitable content stream, such as real-time services in IP/MPLS networks.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory, Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise, Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, comprising:
    establishing a label switched path (LSP) by sending an LSP label from an ingress router to an egress router, wherein the egress router is more than one hop away from the ingress router;
    receiving a packet from a source node in the ingress router;
    classifying the received packet in the ingress router as a first packet type or a second packet type;
    when the packet is the first packet type, forwarding the packet to a next hop; and
    when the packet is the second packet type:
        performing forward error correction (FEC) encoding on the packet to generate repair data;
        modifying the packet by adding a multi-protocol label switching (MPLS) header to indicate that the packet is to be forwarded on the LSP, wherein the LSP is protected using FEC that is based on the performed FEC encoding;
        generating an additional MPLS packet carrying the repair data; and
        transmitting from the ingress router, the modified packet and the additional packet on the LSP to the egress router.

2. The method of claim 1, wherein the ingress router is configured between the source node and a router network, the router network including the next hop.

3. The method of claim 1, wherein the performing the FEC encoding occurs in a network layer of the ingress router.

4. The method of claim 1, wherein the performing the FEC encoding occurs in a transport layer of the ingress router.

5. The method of claim 1, wherein the repair data comprises an MPLS header indicating via a control plane protocol that the repair data is in the LSP.

6. The method of claim 1, wherein the modified packet comprises a first FEC label, and the additional MPLS packet comprises a second FEC label.

7. The method of claim 1, further comprising compressing the modified packet before the transmitting to the egress router.

8. The method of claim 1, wherein the forwarded packet comprises a packet switched network (PSN) tunnel delivery header.

9. The method of claim 1, wherein the modified packet comprises a first PSN tunnel delivery header, and the additional MPLS packet comprises a second PSN tunnel delivery header.

10. An apparatus, comprising:
    one or more processors; and
    logic encoded in one or more tangible media for execution by the one or more processors, and when executed operable to:
    establish a label switched path (LSP) by sending an LSP label from an ingress router to an egress router, wherein the egress router is more than one hop away from the ingress router;
    receive a packet from a source node in the ingress router;
    classify the received packet as a first packet type or a second packet type;
    when the packet is the first packet type, forward the packet to a next hop; and
    when the packet is the second packet type:
        perform forward error correction (FEC) encoding on the packet to generate repair data;
        modify the packet by adding a multi-protocol label switching (MPLS) header to indicate that the packet is to be forwarded on the LSP, wherein the LSP is protected using FEC that is based on the performed FEC encoding;
        generate an additional MPLS packet carrying the repair data; and
        transmit from the ingress router, the modified packet and the additional packet on the LSP to the egress router.

11. The apparatus of claim 10, wherein the ingress router is configured between the source node and a router network, the router network including the next hop.

12. The apparatus of claim 10, wherein the FEC encoding is configured in a network layer of the ingress router.

13. A method, comprising:
 establishing a label switched path (LSP) by receiving in an egress router, an LSP label from an ingress router, wherein the ingress router is more than one hop away from the egress router;
 receiving in the egress router, a packet from the ingress router in a router network;
 determining in the egress router if the received packet is a first packet type or a second packet type;
 when the packet is the first packet type, forwarding the packet from the egress router to a next hop; and
 when the packet is the second packet type:
  performing forward error correction (FEC) decoding on the packet;
  modifying the packet by removing a multi-protocol label switching (MPLS) header indicating the LSP, wherein the packet traversed the LSP to reach the egress router, and wherein the LSP is protected using FEC that is based on the performed FEC decoding; and
  forwarding the modified packet from the egress router to the next hop.

14. The method of claim 13, wherein the egress router is configured between the router network and a destination node.

15. The method of claim 13, wherein the performing FEC decoding occurs in a network layer of the egress router.

16. The method of claim 13, wherein the egress router comprises a destination node for the received packet.

17. The method of claim 13, wherein the determining comprises using an MPLS label of the received packet and looking up the MPLS label in a forwarding database.

18. An apparatus, comprising:
 one or more processors; and
 logic encoded in one or more tangible media for execution by the one or more processors, and when executed operable to:
 establish a label switched path (LSP) by receiving in an egress router, an LSP label from an ingress router, wherein the ingress router is more than one hop away from the egress router;
 receive in the egress router, a packet from the ingress router in a router network;
 determine if the received packet is a first packet type or a second packet type;
 when the packet is the first packet type, forward the packet from the egress router to a next hop; and
 when the packet is the second packet type:
  perform forward error correction (FEC) decoding on the packet;
  modify the packet by removing at least one label that indicates the LSP, wherein the packet traversed the LSP to reach the egress router, and wherein the LSP is protected using FEC that is based on the performed FEC decoding; and
  forward the modified packet from the egress router to the next hop.

19. The apparatus of claim 18, wherein the egress router is configured between the router network and a destination node.

20. The apparatus of claim 18, wherein the FEC decoding is configured in a network layer of the egress router.

\* \* \* \* \*